United States Patent [19]

Eustache

[11] Patent Number: 4,949,420
[45] Date of Patent: Aug. 21, 1990

[54] WINDSHIELD WIPER FOR SWEEPING A NON-CIRCULAR AREA, IN PARTICULAR FOR A WINDSHIELD OF AN AUTOMOTIVE VEHICLE

[75] Inventor: Jean-Pierre Eustache, Antony, France

[73] Assignee: Valeo Systemes d'Essuyage, Montigny-le-Bretonneux, France

[21] Appl. No.: 489,230

[22] Filed: Mar. 6, 1990

[30] Foreign Application Priority Data

Mar. 9, 1989 [FR] France ............................ 89 03096

[51] Int. Cl.$^5$ .............................................. B60S 1/20
[52] U.S. Cl. ............................. 15/250.13; 15/250.23; 15/250.21
[58] Field of Search ........... 15/250.13, 250.21, 250.23, 15/250.24

[56] References Cited

U.S. PATENT DOCUMENTS 2,629,891 3/1953 Greene ............................ 15/250.13
4,815,159 3/1989 Kuhbach ........................ 15/250.21

FOREIGN PATENT DOCUMENTS 2430831 7/1976 Fed. Rep. of Germany .
2598665 11/1987 France .

Primary Examiner—Harvey C. Hornsby
Assistant Examiner—Gary K. Graham
Attorney, Agent, or Firm—Dennison, Meserole, Pollack & Scheiner

[57] ABSTRACT

This windshield wiper includes: a crank member which is adapted to be driven relative to a body in an alternating rotational movement by means of a motor spindle; at least one windshield wiper arm which is mounted in the crank member with a facility for sliding therein in a radial direction; and control means for producing the sliding movements of the arm, the control means comprising at least one flexible band which is adapted to control the said sliding movement in one direction, together with return means for ensuring that the arm slides in the opposite direction. The flexible band describes, within the crank member, a sinuous path over rotatable pulleys which are spaced apart in a direction substantially parallel to the arm, with one end of the flexible band being connected to a fixed point on the crank member while, at its other end, the flexible band is connected to the windshield wiper arm. At least one of the pulleys is mounted on an axis which is displaceable in a transverse direction with respect to the arm.

10 Claims, 3 Drawing Sheets

WINDSHIELD WIPER FOR SWEEPING A NON-CIRCULAR AREA, IN PARTICULAR FOR A WINDSHIELD OF AN AUTOMOTIVE VEHICLE

FIELD OF THE INVENTION

This invention relates to a windshield wiper for sweeping a non-circular area, the wiper being of the kind comprising: a crank member adapted to be driven relative to a body in an alternating rotational movement by means of a motor spindle; at least one windshield wiper arm mounted in the crank member and arranged for sliding movement in the radial direction; and control means for the sliding movements of the arm, the said control means comprising a flexible band means, which is adapted to control the sliding movement in one direction, the control means further comprising return means for causing sliding movement of the arm in the opposite direction.

More particularly, the invention is concerned with a windshield wiper for sweeping a non-circular area on the windshield of an automotive vehicle.

BACKGROUND OF THE INVENTION

It is known that such a non-circular sweeping action aims primarily to increase the surface area which is swept, particularly towards the corners of the area which are furthest from the motor spindle, in comparison with a conventional circular sweeping pattern. However, windshield wipers of the kind defined above, as known at the present time, are of relatively complicated construction and give only limited amplitudes to the sliding movement of the arms.

SUMMARY OF THE INVENTION

A principal object of the invention is to provide a windshield wiper of the kind defined above which will be of simple and robust construction, while being of a size that is reduced as much as possible as compared with known structures, and being reliable in operation.

A further object is to provide that the amplitude of the radial sliding movement of the arm can be large enough to enable an effective non-circular sweeping action to be obtained in the region of the angles or corners of the surface to be swept, and in particular in the region of the upper corners of a windshield.

In accordance with the invention, a windshield wiper of the kind defined above is characterised by the fact that the flexible band means comprises a flexible band which describes in the interior of the crank member a sinuous path over rotatable pulleys which are spaced apart in a direction substantially parallel to the arm, one end of the flexible band being connected to a fixed point of the crank member, while at its other end the flexible band is connected to the windshield wiper arm, with at least one of the pulleys being mounted on an axis which is displaceable in a transverse direction with respect to the arm, while at least one further pulley is mounted on an axis that is fixed in relation to the crank member, a return pulley being disposed in such a way that the run of the band towards its point of attachment on the arm is orientated in a direction substantially parallel to that of the arm, with driving means being provided in addition, for shifting the displaceable pulley or pulleys in the transverse direction during rotation of the crank member.

Preferably, the return means for ensuring the radial displacement of the arm in the opposite direction comprise a second flexible band describing a sinuous path in the interior of the crank member over a second group of rotatable pulleys, at least one of which is mounted on an axis that is fixed with respect to the crank member, with at least one other of the pulleys in the second group being mounted on an axis which is displaceable in a direction that is transverse with respect to the arm, the said second flexible band being connected at one end thereof to a fixed point of the crank member, and at its other end to the arm, the displaceable pulleys of the second band being coupled with those of the first band in such a way that the variations in the operative length of each flexible band take place in opposite directions.

Preferably, each flexible band comprises an inextensible belt or cable.

The axes on which the transversely displaceable pulleys are mounted are preferably carried by a sliding carrier which is guided in translational movement relative to the crank member, in a transverse direction with respect to the arm. The displacements of the sliding carrier are controlled by a pin which is eccentrically mounted and which is driven by a toothed pinion, the axis of rotation of which is connected to the crank member, the said pinion being adapted to mesh with a toothed crown which is fixed with respect to the said body, and the above mentioned eccentric pin being engaged in an oblong slot of the sliding carrier, the said slot extending substantially parallel to the longitudinal direction of the windshield wiper arm.

Preferably, each flexible band extends around three of the said pulleys having fixed axes and two of the said pulleys having displaceable axes, the latter pulleys being situated between the former pulleys in a direction parallel to the arm.

The fixed axes of the appropriate pulleys are aligned parallel to the longitudinal direction of the arm, as are those of the displaceable pulleys.

In preferred embodiments of the invention, the two assemblies of flexible bands and pulleys are situated respectively on either side of the mean longitudinal direction of the arm, with the end of one flexible band that is connected to a fixed point on the crank member being spaced at a distance from the end of the other flexible band which is also connected to a fixed point of the crank member, the return pulley of one of the said assemblies being close, in the said longitudinal direction of the arm, to the fixed anchor point of the flexible band of the other said assembly.

The points at which the flexible bands are attached to the arm are preferably situated between the two return pulleys in the longitudinal direction of the arm.

The windshield wiper in accordance with the invention in one form comprises a single said arm, the displacements of which are controlled by the two flexible bands, the flexible bands being adapted to exert respectively a tractive force in one sense or in the opposite sense along the longitudinal direction of the arm. In this case, the non-circular sweeping action that is obtained leads to a significant increase in the surface area which is swept in the upper corners or angles, accompanied by a slight reduction (by comparison with conventional circular sweeping) in the swept surface area in the vicinity of the driving spindle.

However, in another form of the windshield wiper according to the invention, it comprises two of said arms, parallel to each other and mounted for radial sliding movement in the crank member, the said arms being adapted to be displaced in radial translational movement in opposite directions, a first said arm being connected to a run of a said flexible band situated on one side of a return pulley, while the second arm is connected to a further run of the same flexible band situated on the other side of the said return pulley in such a way as to undergo displacements in the opposite direction from the first mentioned band run. This arrangement allows an increase to be obtained in the swept surface area in the vicinity of the motor spindle also.

Based on the arrangements disclosed above, the invention embraces a number of other arrangements, which will appear below more explicitly in connection with the examples of particular embodiments that will be described below, by way of example only and not in any way to be taken as limiting, with reference to the accompanying drawings.

DESCRIPTION OF PREFERRED EMBODIMENTS OF THE INVENTION

Figure 1:
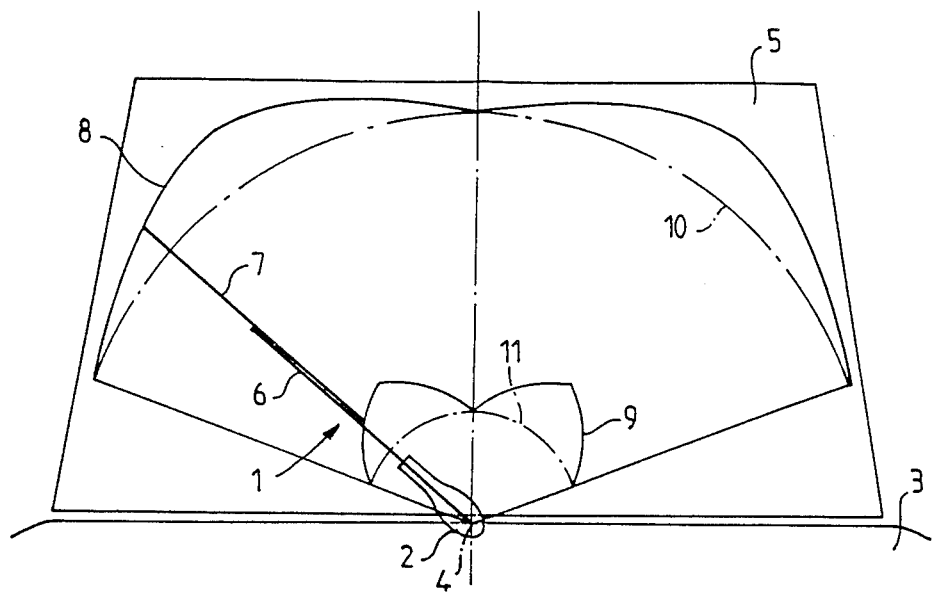
FIG. 1 of these drawings is a diagram illustrating a non-circular sweeping pattern which is obtained with a windshield wiper in accordance with the invention.

Referring to FIG. 1 of the drawings, this shows a non-circular sweeping or wiping pattern which is obtained with a windshield wiper 1. The wiper 1 includes a crank member 2 which is adapted to be driven, in relation to a body 3, in an alternating rotational movement by means of a motor spindle 4. The body 4 is the body of an automotive vehicle, while the surface 5 to be wiped or swept is the windshield of the same vehicle.

A windshield wiper arm 6 is mounted in the crank member 2 in such a way that it can slide in the radial direction. In the conventional way, the arm 6 carries a wiper blade 7 which wipes the windshield 5.

Control means C (FIGS. 2 and 3), for controlling the sliding movements of the arm 6, are provided in such a way that the paths followed by the ends of the blade 7 correspond to the curves indicated in full lines at 8 and 9 in FIG. 1. From this, it will be apparent that the curve 8, which represents the path followed by the end of the blade 7 that is furthest from the spindle 4, represents a significant increase in the swept surface area, in the region of the upper angles of the windshield, as compared with a conventional circular sweeping pattern as represented by the arc of a circle indicated in phantom lines at 10. This increase in swept area is substantially greater than the reduction in swept surface which is evident towards the other end of the blade 7, i.e. the end closest to the spindle 4. In this case the curve indicated in phantom lines at 11 is that which corresponds to conventional circular sweeping.

Figure 3:
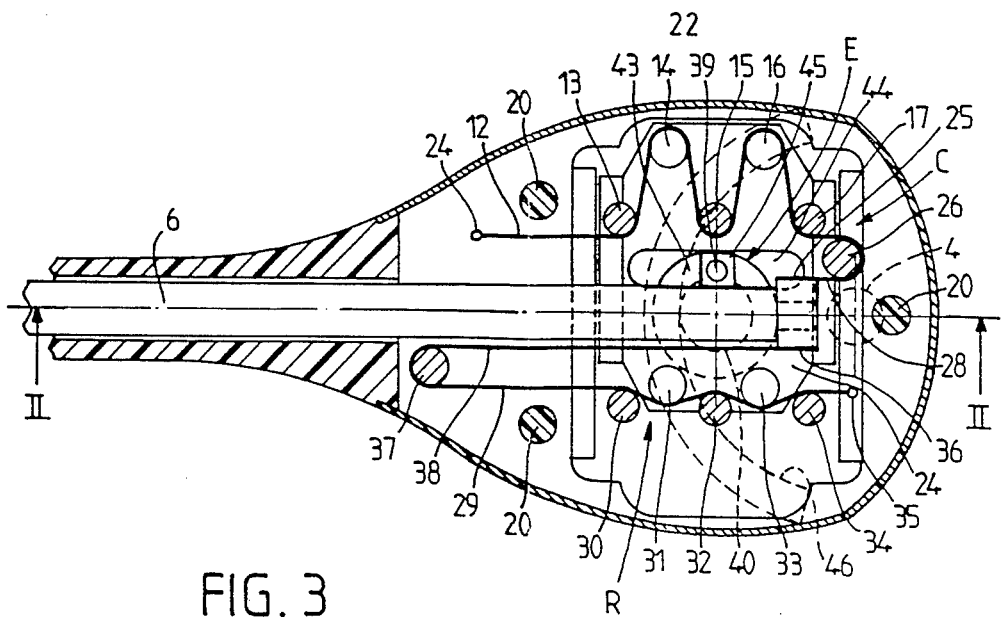
FIG. 3 is a simplified view on a smaller scale, taken on the line III—III in FIG. 2.
Figure 2:
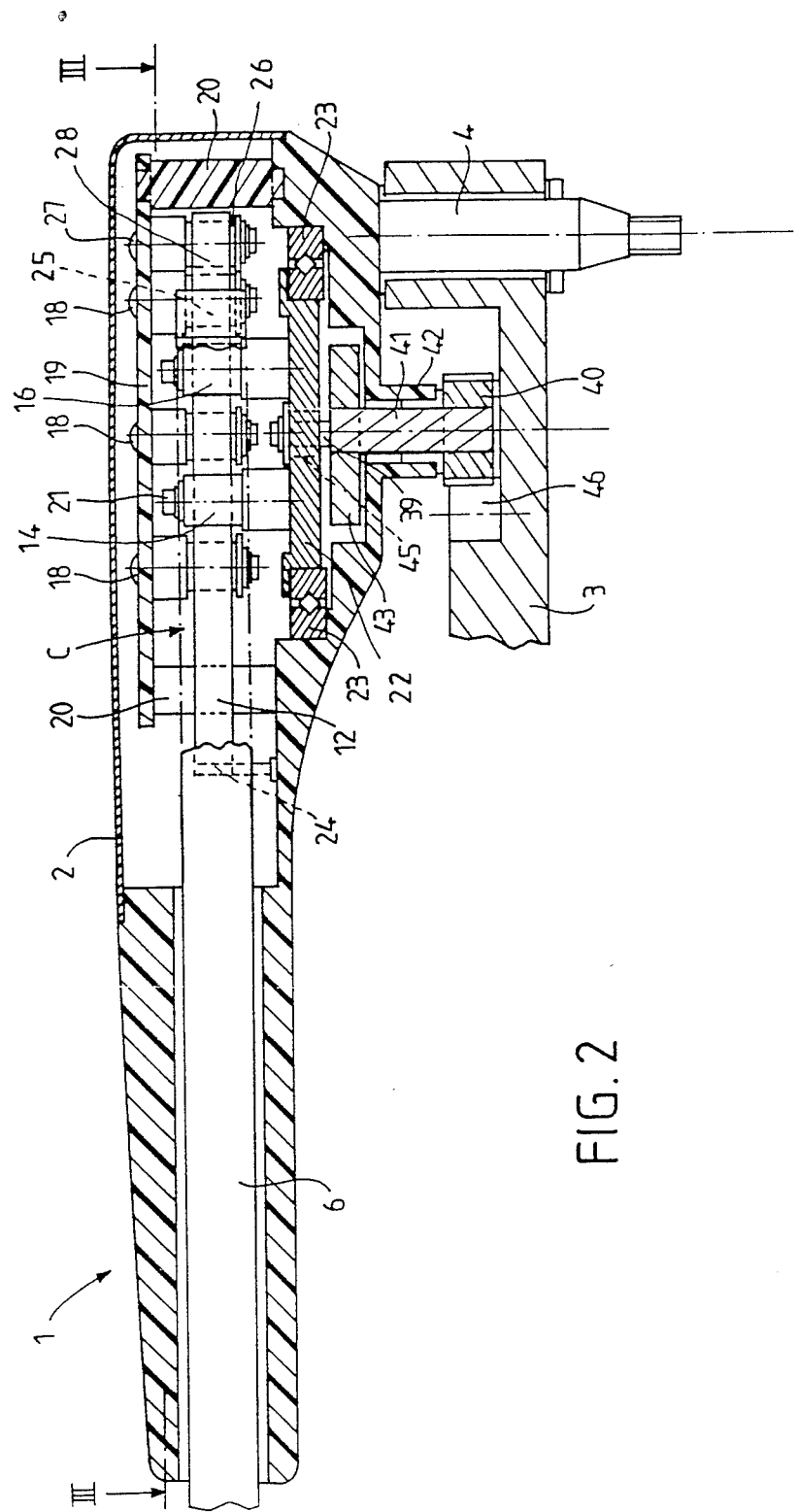
FIG. 2 is a cross section on a larger scale, taken on the line II—II in FIG. 3, and showing a windshield wiper in accordance with the invention.

As can be seen in FIG. 3, the control means comprise a first flexible band 12 which describes, within the hollow crank member 2, a sinuous path in which it extends over rotatable pulleys 13 to 17. These pulleys are spaced apart from each other in a direction which is substantially parallel to the arm 6, and are spaced from each other in the transverse direction. In the example under consideration, the band 12 passes around three pulleys 13, 15 and 17, the axes rotation 18 of which (FIG. 2) are fixed with respect to the crank member 2 and aligned in a direction parallel to the arm 6. These axes 18 are, in addition, substantially parallel to the motor spindle 4. As can be seen in FIG. 2, the axes 18 are fixed at their upper end on a plate 19 which is supported by spacer bars 20, the latter being fixed on the base portion of the crank member 2. The pulleys 13, 15 and 17 are arranged below, i.e. within, the plate 19. The flexible band 12 preferably consists of an inextensible belt.

The pulleys 14 and 16 are mounted for rotation about axes 21 (FIG. 2), which are mounted so as to be displaceable transversely with respect to the arm 6. These axes 21 are also parallel to the motor spindle 4, and are aligned in a direction which is substantially parallel to the arm 6. The axes 21 are supported by a sliding carrier 22 which is mounted for transverse sliding movement on the base of the crank member 2, for example with the assistance of rolling slides 23.

One end 24 (FIG. 2) of the flexible band is connected to a fixed point on the crank member 2, while at its other end the flexible band 12 is connected at a point 25 to the windshield wiper arm 6. A return pulley 26 is mounted for rotation on an axis 27 (FIG. 2), which is fixed with respect to the crank member, on the side remote from the end 24. This pulley 26 is arranged in such a way that the run 28 of the band 12, towards its point of attachment 25, follows a direction which is substantially parallel to that of the arm 6.

Driving means E, which will be described in greater detail layer on in this description, are provided for the purpose of displacing the movable pulleys 14 and 16 in the transverse direction with respect to the arm 6, during rotation of the crank member 2. It will be understood from FIG. 3 that an upward sliding displacement (as seen in the Figure) of the sliding carrier 22 will carry the movable pulleys 14 and 16 further away in the transverse direction from the fixed pulleys 13, 15 and 17, thus elongating the sinuous path of the band 12 between these pulleys. As a result, the available length of the band run 28 is reduced. This causes a pulling force to be exerted on the arm 6, so that the latter is moved from left to right as seen in FIG. 3. The arm 6 thus becomes retracted into the crank member 2, and causes the wiper blade 7 to be brought closer to the motor spindle 4.

Return means R are provided for the purpose of ensuring the radial displacement of the arm 6 in the opposite direction, that is to say by way of extension away from the crank member. These return means R include a second flexible band 29, which preferably consists of an inextensible belt, and which again describes a sinuous path within the interior of the crank member. The band 29 passes over a second group of rotatable pulleys 30 to 34. This group of pulleys is situated on the opposite side of the arm 6 from that on which the first group, associated with the band 12, is located.

The pulleys 30, 32 and 34 are mounted for rotation about axes which are fixed with respect to the crank member 2, in a manner similar to the pulleys 13, 15 and 17. These two groups of fixed pulleys together form a symmetrical array about the mean direction (corresponding to the line II—II in FIG. 3) of movement of the arm 6. The pulleys 31 and 33 are rotatably mounted about respective axes which are displaceable transversely in the same way as those of the pulleys 14 and 16; the axes of the pulleys 31 and 33 are carried by the sliding carrier 22, and are symmetrical with the axes of the pulleys 14 and 16 with respect to the centre plane of the sliding carrier 22 parallel to the arm 6.

The flexible band 29 is connected at a fixed point to the crank member 2 at the end 35 of the band which is remote from the end 24 of the band 12. Towards its other end 36, the band 29 is connected to the arm 6, after passing around a return pulley 37 which is rotatably mounted about an axis that is fixed with respect to the crank member 2, the pulley 37 being substantially opposite to the pulley 26. The pulley 37 allows a band run 38, substantially parallel to the arm 6 and extending from the end 36 of the band, to be obtained.

The driving means E for the sliding carrier 22 include a drive pin 39 (see FIGS. 2 and 3), which is mounted eccentrically and which is driven by a toothed pinion 40 fixed on a spindle 41 (FIG. 2). The spindle 41 is rotatably mounted in a bearing 42 carried by the crank member 2. The pinion 40 projects below the crank member, with the bearing 42 extending outwardly from and below the base of the latter. The drive pin 39 is preferably mounted on a disc 43, which is housed within the crank member 2 and which has a larger diameter than the pinion 40. The disc 43 is secured on the drive spindle 41 of the pinion.

The drive pin 39 is engaged in an oblong slot 44 (FIG. 3) which is provided in the sliding carrier 22 and which extends parallel to the direction of the arm 6. A slide block 45, generally square in shape, is rotatably mounted on the pin 39 so as to be displaced in sliding movement within the slot 44, with a reduced clearance. The axis of the bearing 42 is offset from the axis of the motor spindle 4, as can be seen in FIG. 2, in such a way that the drive spindle 41 is carried along a circular path with the movement of the crank member 2. The pinion 40 meshes with a toothed crown sector 46 which is fixed with respect to the body 3. The sector 46 is centred on the axis of the spindle 4.

The operation of the windshield wiper as shown in FIGS. 2 and 3 will at once be clear from the foregoing description. When the crank member 2 is rotating, the pinion 40, cooperating with the toothed sector 46, causes the drive pin 39 to rotate with respect to the crank member 2. The pin 39 and the slide block 45 transmit the transverse component of their movement to the sliding carrier 22. The sliding movement in the slot 44 absorbs the longitudinal component, parallel to the arm 6, of the displacement of the pin 39.

When the sliding carrier 22 is moved upwardly as seen in FIG. 3, the length of the band run 28 is reduced, while that of the band run 38 increases. The arm 6 is drawn from left to right and retracts into the crank member 2. In order to effect a transverse displacement of the sliding carrier 22 in the opposite direction, i.e. downwardly with reference to FIG. 3, the band run 38 is reduced in length and pulls on the arm 6 in order to draw it outwardly with respect to the crank member 2; simultaneously, the band run 28 is lengthened, thus permitting this outward extension of the arm 6 to take place.

The ratio of the diameters of the pinion 40 and toothed sector 46, and their angular offset, are chosen in such a way that the maximum extension of the arm 6 from the crank member 2 takes place in two neighbouring angular positions of the lines joining the motor spindle 4 to the apices of the upper angles of the windshield; while the position of maximum retraction of arm 6 occurs in the two extreme positions of the windshield wiper, and in its central position.

Figure 4:
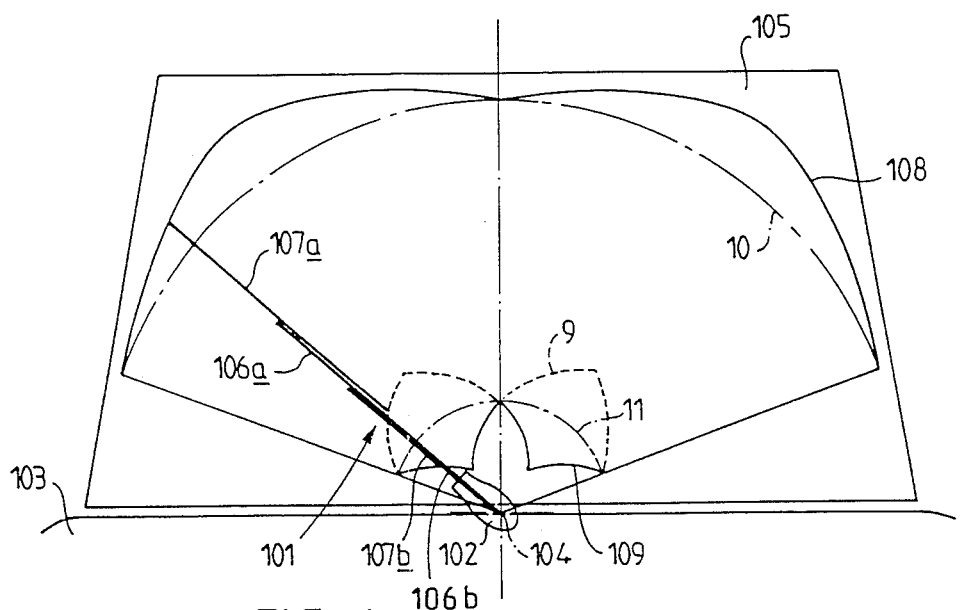
FIG. 4 shows a sweeping pattern which is obtained with a second embodiment of the windshield wiper in accordance with the invention.
Figure 5:
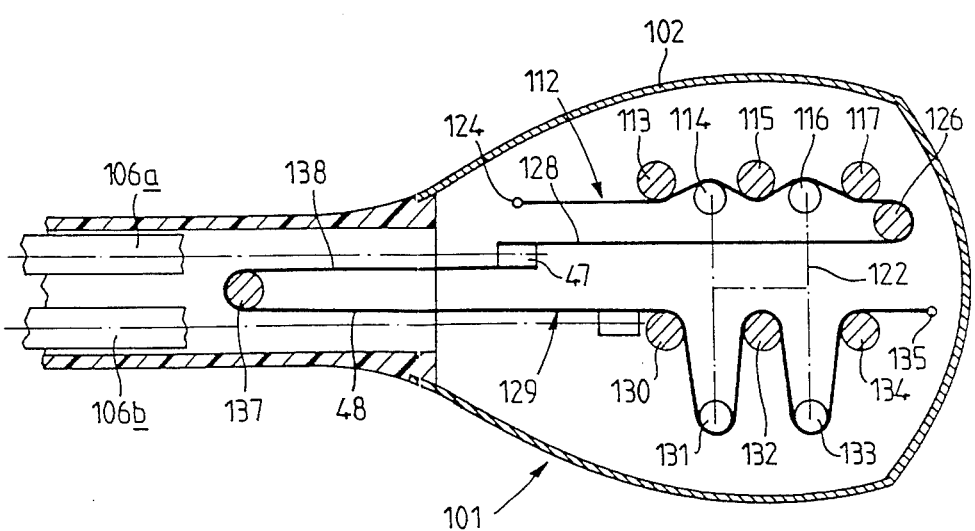
FIG. 5, finally, is a simplified view similar to FIG. 3, but showing the said second embodiment of the invention.

Reference is now made to FIGS. 4 and 5, which show a second embodiment of the invention. Those reference numerals used in FIGS. 4 and 5 which are used to indicate elements which are identical or similar to elements already described with reference to FIGS. 1 to 3, are equal to the sum of the number 100 and the corresponding reference numeral in FIGS. 1 to 3. The description of such elements will either not be repeated or will only be briefly repeated.

FIG. 4 shows the sweeping pattern which is obtained with the windshield wiper in accordance with this second embodiment. The upper edge 108 of the swept zone is identical with the edge 8 in FIG. 1. By contrast, the lower edge 109, which is also indicated in full lines, is closer to the motor spindle 104, and not only lies within the edge 9 of FIG. 1 (which is shown in broken lines in FIG. 4), but also lies within the edge 11 of a corresponding conventional circular swept area. There is thus an increase in the swept surface, not only at the outer end of the windshield wiper, but also in the vicinity of the motor spindle.

The windshield wiper 101, as seen in FIG. 5, includes two parallel arms 106a, 106b, which are mounted for radial sliding movement in the crank member 102. Each of these arms is provided with a corresponding blade 107a (FIG. 4), which is provided for the purpose of sweeping the zone that lies radially outwardly, while another wiper blade 107b is provided for sweeping the radially inner zone.

On either side of the central plane that lies between the arms 106a and 106b, there are again provided the two flexible bands 112 and 129, and the corresponding groups of pulleys that are rotatable on fixed axes, together with the pulleys on axes which are displaceable with respect to the crank member 102. The transversely movable sliding carrier 122, carrying the axes of the movable pulleys, has been indicated diagramatically.

The return pulley 137 is placed at a slightly greater outward radial distance from the sliding carrier 122 than in the embodiment shown in FIG. 3, and its axis is located equidistantly from the arms 106a and 106b. The arm 106a is connected at its end 47, firstly to the band run 128 of the first flexible band 112, and secondly to the band run 138 of the second flexible band 129. The band run 138 lies on the same side of the pulley 137 as the band run 128. The band runs 128 and 138 are thus connected to each other through this end 47, in a manner similar to the arrangement seen in FIG. 3. The arm 106b is connected to the band run 48 of the second flexible band 129, situated on the other side of the return pulley 137 from the band run 138, so that the arm 106b is moved in the opposite direction from the first arm 106a.

The driving means for the sliding carrier 122 in its transverse movements have not been shown in FIG. 5; these means are identical to those described with reference to FIGS. 2 and 3.

The operation of the windshield wiper 101 of FIG. 5 will readily be deduced from the foregoing description. The two arms 106a and 106b, during rotation of the crank member 102, perform sliding movements in opposite directions, so that when the arm 106a and its corresponding blade 107a are in their position of maximum extension, i.e. when the arm is directed substantially towards one of the upper angles of the windshield 105, the arm 106b and its blade 107b are brought to their maximum extent towards the motor spindle 104.

The two extreme sweeping positions and the central position (see FIG. 4) which correspond to the minimum extension of the arm 106a correspond also to the maximum extension of the arm 106b.

Whatever embodiment is adopted, the arrangement that allows alternating displacements of the arm 6, or of the arms 106a and 106b, in sliding movement, is relatively simple and compact, and is reliable in operation. It allows relatively large amplitudes of sliding movement to be obtained, due to the amplification effect obtained by means of the sinuous path followed by the flexible bands.

What is claimed is:

1. A windshield wiper for sweeping in a non-circular pattern, comprising: a crank member defining an axis of rotation and means for coupling the crank member to a motor spindle such that the crank member can be driven in relation to a body, in an alternating rotational movement about said axis, by means of the said motor spindle; at least one windshield wiper arm mounted in the crank member for sliding movement therein in a radial direction with respect to said axis; and control means in the crank member for the sliding movements of the arm, the said control means comprising at least one flexible band for controlling the said sliding movement in one direction, and return means in the crank member for ensuring the said sliding movement in the opposite direction, wherein the wiper further comprises within the crank member: at least one axis mounting a first rotatable pulley thereon; at least one second axis mounting a second rotatable pulley thereon, said first and second axes being spaced apart in a direction substantially parallel to the arm; means mounting said at least one axis in a fixed position in the crank member; driving means in the crank member and coupling means coupling the driving means with said second axis or axes, for shifting the latter in a direction transverse to the said arm in response to rotation of the crank member; means attaching a first end of a said flexible band to a fixed point in the crank member and its second end to the said arm; a return pulley; and means mounting the return pulley in the crank member, with the said band defining a sinuous path from said first end, over said first and second pulleys alternately and over said return pulley, to define, between the latter and the point of attachment of the band to the arm, a run of the band oriented substantially parallel to the arm.

2. A windshield wiper according to claim 1, in which the said flexible band is a first flexible band, and wherein the said return means comprises: at least one third axis mounting a third rotatable pulley thereon; at least one fourth axis mounting a fourth rotatable pulley thereon; means mounting said third axis in a fixed position in the crank member; a second flexible band within the crank member; and means attaching a first end of said second band to a fixed point in the crank member and its second end to the said arm, with the second band defining a sinuous path from its said first end and over said third and fourth pulleys alternately, the return means further comprising coupling means coupling the fourth axis or axes with the second axis or axes whereby the former are displaceable transversely to the said arm in response to rotation of the crank member, and means mounting the second band between its associated pulleys and its second end in such a way that variations in the operative lengths of the two bands take place in opposite directions.

3. A windshield wiper according to claim 1 or claim 2, wherein the flexible band comprises an inextensible belt or cable.

4. A windshield wiper according to claim 1 or claim 2, wherein the coupling means include a sliding carrier and means for guiding the latter in translational movement in and transversely to the crank member, with the sliding carrier mounting thereon the said axis or axes displaceable transversely, whereby to effect such transverse displacement.

5. A windshield wiper according to claim 4, wherein the driving means comprise a pinion, means mounting the pinion rotatably in the crank member, a toothed crown meshing with the pinion, and means securing the crown to the said body, the coupling means further comprising an eccentric pin, and means coupling the pin with the pinion for rotation of the pin by the pinion, the sliding carrier having an oblong slot substantially parallel to the said arm, with the eccentric pin engaging in the said slot whereby to effect the transverse displacements of the carrier.

6. A windshield wiper according to claim 1, wherein the flexible band extends around three of the said pulleys having fixed axes and two of the said pulleys having displaceable axes, the latter pulleys being situated between the former pulleys in a direction parallel to the arm.

7. A windshield wiper according to claim 2, wherein the assemblies comprising, respectively, the first band and its associated pulleys, and the second band and its associated pulleys, are on opposite sides of the said arm, the first ends of the bands being spaced away from each other, with one of said bands passing over a said return pulley close, in the longitudinal direction of the arm, to the end of the other band that is fixed to the crank member.

8. A windshield wiper according to claim 2, wherein the attachment points of the flexible bands to the arm are situated, considered in the longitudinal direction of the arm, between two said return pulleys, one associated with each band.

9. A windshield wiper according to claim 1 or claim 2, comprising a single said arm, the displacements of which are controlled by the two flexible bands, the flexible bands being adapted to exert respectively a tractive force in one sense or in the other sense along the longitudinal direction of the arm.

10. A windshield wiper according to claim 1, comprising two of said arms, parallel to each other and mounted for radial sliding movement in the crank member, the said arms being adapted to be displaced in radial translational movement in opposite directions, a first said arm being connected to a run of a said flexible band situated on one side of a said return pulley, while the second arm is connected to a further run of the same flexible band situated on the other side of the same return pulley, in such a way as to undergo displacements in the opposite direction from the first mentioned band run.

* * * * *